(12) United States Patent
Gebauer et al.

(10) Patent No.: US 7,222,901 B2
(45) Date of Patent: May 29, 2007

(54) VACUUM HANDLING DEVICE HAVING A SUCTION NOZZLE AND A GRIPPER PART CONTAINED WITHIN A SINGLE HOUSING

(75) Inventors: Günter Gebauer, Esslingen (DE); Jürgen Schnatterer, Wolfschlugen (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 10/486,547

(22) PCT Filed: Sep. 12, 2002

(86) PCT No.: PCT/EP02/10228

§ 371 (c)(1),
(2), (4) Date: Feb. 9, 2004

(87) PCT Pub. No.: WO03/026853

PCT Pub. Date: Apr. 3, 2003

(65) Prior Publication Data

US 2005/0258657 A1 Nov. 24, 2005

(30) Foreign Application Priority Data

Sep. 21, 2001 (DE) .......................... 201 15 549 U

(51) Int. Cl.
*B25J 15/06* (2006.01)
(52) U.S. Cl. ..................... 294/64.1; 294/64.2
(58) Field of Classification Search ............. 294/64.1, 294/64.2, 64.3, 65; 417/185, 193
See application file for complete search history.

(56) References Cited

U.S. PATENT DOCUMENTS

| | | | | |
|---|---|---|---|---|
| 3,107,794 A | * | 10/1963 | Bechtold et al. ............ 414/929 |
| 3,568,959 A | * | 3/1971 | Blatt ........................... 294/64.2 |
| 3,637,249 A | * | 1/1972 | Kuhl et al. .................. 294/64.1 |
| 3,702,698 A | * | 11/1972 | Schwebel .................... 271/103 |
| 3,834,558 A | * | 9/1974 | Bru ............................ 294/64.1 |
| 3,899,087 A | | 8/1975 | Tamble et al. |
| 3,902,605 A | | 9/1975 | Hamilton |
| 3,967,849 A | * | 7/1976 | Cagle .......................... 294/64.2 |
| 3,991,997 A | * | 11/1976 | Barber ........................ 294/64.1 |
| 4,029,351 A | | 6/1977 | Apgar et al. |
| 4,640,503 A | * | 2/1987 | Naumann ..................... 271/90 |
| 4,655,692 A | * | 4/1987 | Ise ............................... 294/64.2 |
| 4,736,938 A | * | 4/1988 | Jiruse et al. ................... 271/90 |
| 4,753,104 A | * | 6/1988 | Strozier ......................... 72/457 |
| 5,076,564 A | * | 12/1991 | Marass ......................... 271/11 |
| 5,193,776 A | * | 3/1993 | Nagai et al. ................ 294/64.1 |
| 5,201,875 A | * | 4/1993 | Tessier et al. .............. 294/64.1 |
| 5,277,468 A | * | 1/1994 | Blatt et al. .................. 294/64.2 |

(Continued)

FOREIGN PATENT DOCUMENTS

DE 1 132 053 6/1962

(Continued)

*Primary Examiner*—Patrick Mackey
*Assistant Examiner*—Paul T. Chin
(74) *Attorney, Agent, or Firm*—Hoffmann & Baron, LLP

(57) ABSTRACT

A vacuum handling device comprises includes a vacuum source having a suction nozzle means (6) operating on the ejector principle and furthermore a suction gripper (3) which possesses a gripper part (26) connected with the suction side of the suction nozzle (6). The housing of the vacuum source (2) and of the suction gripper (3) constitute a housing unit (4), the gripper part (26) being adjustably mounted on the housing unit (4) for setting in the acting suction direction (44) thereof.

20 Claims, 1 Drawing Sheet

U.S. PATENT DOCUMENTS

| | | | |
|---|---|---|---|
| 5,451,086 A * | 9/1995 | Pazzaglia | 294/64.1 |
| 5,727,418 A * | 3/1998 | Strozier | 72/457 |
| 5,755,471 A * | 5/1998 | Bjorklund et al. | 294/64.1 |
| 6,065,789 A * | 5/2000 | Nagai et al. | 294/64.1 |
| 6,168,220 B1 * | 1/2001 | Schmalz et al. | 294/64.1 |
| 6,213,521 B1 * | 4/2001 | Land et al. | 285/61 |
| 6,663,092 B2 * | 12/2003 | Kashiwazaki et al. | 294/64.1 |

FOREIGN PATENT DOCUMENTS

| | | |
|---|---|---|
| DE | 86 32 996 | 3/1987 |
| DE | 36 24 017 | 2/1988 |
| DE | 41 33 135 | 4/1992 |
| DE | 92 15 404.2 | 1/1993 |
| DE | 200 11 839.0 | 12/2000 |
| DE | 20011839 | * 12/2000 |
| WO | WO 82/01482 | 5/1982 |

* cited by examiner

VACUUM HANDLING DEVICE HAVING A SUCTION NOZZLE AND A GRIPPER PART CONTAINED WITHIN A SINGLE HOUSING

This application claims priority based on an International Application filed under the Patent Cooperation Treaty, PCT/EP02/10228, filed on Sep. 12, 2002, and German Patent Application No. DE 201 15 549.4, filed on Sep. 21, 2001.

FIELD OF THE INVENTION

The invention relates to a vacuum handling device comprising a vacuum source, which possesses a suction nozzle means adapted to operate on the ejector principle and furthermore a suction gripper which possesses a gripper part connected with the suction side of the suction nozzle means.

BACKGROUND OF THE INVENTION

In the case of a vacuum handling device of this type described in the German patent publication (utility model) 20,011,839 an independent vacuum source is provided, which is fitted with a suction nozzle means able, on being supplied with a pressure medium, to produce a suction effect at a suction side. The suction side is connected by a fluid duct with a suction gripper, which comprises a gripper part constituted by a suction cup to be applied to the object to be handled. By the operation of the suction nozzle means air is sucked from the internal space in the gripper part so that the object to be handled is drawn against the gripper part.

The German patent publication (utility model) 9,215,404 discloses a suction gripper having a moving gripper part biased by spring means so that on application to an object to be handled a compensation of length of the suction gripper is possible. The suction gripper is kinematically coupled with a handling means and for producing the suction effect may be connected with a pressure medium storage means or a vacuum pump.

A comparable arrangement is disclosed in the German patent publication (utility model) 4,133,135 A1. Here a suction gripper provided with a moving gripper part is held on a robot arm, the gripper part being connected by way of a pipe with a vacuum suction system.

SUMMARY OF THE INVENTION

One object of the present invention is to provide a vacuum handling device of the type initially mentioned, which has a simple structure and compact dimensions.

In order to achieve this object there is the provision that the housing of the vacuum source and the suction gripper constitute a housing unit and that the gripper part is mounted in an adjustable manner on the housing unit for setting in its acting suction direction.

In the case of this vacuum handling device the vacuum source and the suction gripper are collected together as a compact structural unit, the housing unit present assuming the housing function both as regards the vacuum source and also as regards the suction gripper. If the vacuum handling device is moved and positioned during the use thereof there is accordingly a ganged movement and positioning both of the vacuum source and of the suction gripper. It is in this manner that it is possible to do without movable fluid connections, and it is possible for all components to be collected together in a minimum of space. The support function, which is adjustable in the suction direction, of the gripper part on the housing unit renders possible the assumption of different relative positions of the gripper part and of the housing unit, something which for example permits a certain adaptation in length on application of the gripper part to an object to be handled.

Further advantageous developments of the invention are defined in the dependent claims.

It would in principle be possible to make up the housing unit of a plurality of housing components permanently connected together. Preferably however a one-piece design of the housing unit is provided.

The vacuum source and the suction gripper are preferably arranged in the acting suction direction one after the other, something which renders possible a very slim design.

The suction nozzle means may comprise a single suction nozzle for producing the desired vacuum. Should a higher suction power be desired it is possible for the suction nozzle means to comprise a plurality of suction nozzles functionally connected together in series.

One or more suction nozzles can be designed in the form of a cartridge-like structural units, which may be installed simply by plugging into the housing unit.

It is advantageous for the fluid connection between the gripper part and the suction side of the suction nozzle means to be within the housing unit so that it is possible to do without external fluid lines.

In the case of a further convenient design inside the interior of the housing unit the gripper part delimits an active or working plenum communicating with the suction side of the suction nozzle unit, the vacuum building up in the active plenum being able to cause setting of the gripper part in relation to the housing unit from a farther extended position into a farther retracted position. This effect may be employed in order to lift an object without having to move the housing unit itself. When the vacuum handling device has its gripper part applied to an object to be lifted, the object is aspirated by the suction action during operation of the suction nozzle means. Furthermore, the vacuum building up in the active plenum means that the gripper part is withdrawn into the housing unit owing to the pressure differential built up, something which in the case of a vertical alignment of the vacuum handling device means an upward movement of the gripper part with the object sucked onto it.

Preferably the gripper part is biased by spring means into the farther out, extended position moved the latter position preferably being the home position of the gripper part.

The gripper part has at least one suction space at the outer end thereof, such space being for example defined by a flexible suction cup, and being connected by way of a duct extending through the gripper part with the active plenum.

In the following the invention will be described with reference to the accompanying drawings.

DESCRIPTION OF THE PREFERRED EMBODIMENTS

Figures 1, 2:
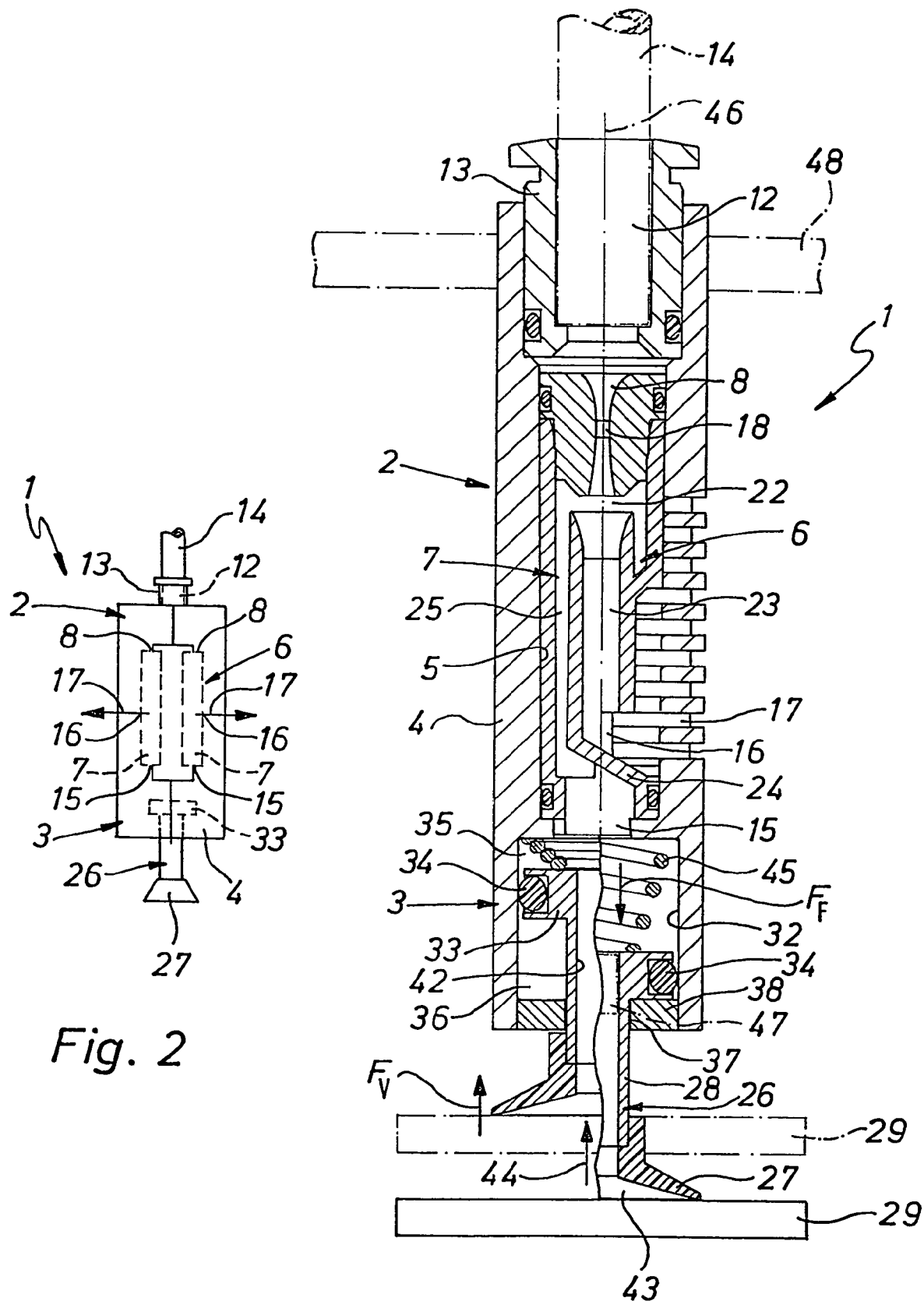
FIG. 1 is a longitudinal section taken through a preferred embodiment of the vacuum handling device in accordance with the invention, the gripper part being illustrated in two different position on either side of the longitudinal axis.
FIG. 2 is a highly diagrammatic representation of a further embodiment of the vacuum handling device whose suction nozzle means is fitted with two suction nozzles connected functionally in parallel.

The vacuum handling device 1 is composed of two principal parts, that is to say a first part in the form of a vacuum source 2 and a second part in the form of a suction gripper 3. These parts constitute a rigid structural unit, same being held together by a housing unit 4, which constitutes both the housing of the vacuum source 2 and also the housing of the suction gripper 3.

The housing unit 4 preferably possesses an elongated configuration and is preferably manufactured integrally. Admittedly it would be possible to divide up the housing unit 4 into, for instance, two housing components, of which the one would constitute the housing of the vacuum source 2 and the other the housing of the suction gripper 3 and which to form the housing unit would be rigidly and permanently connected together. However the integral housing design of the working example possesses substantial advantages over such a design, more particularly as regards the costs of manufacture and assembly.

Preferably the housing unit 4 is designed in the form of a hollow body, which contains a cavity 5 which is preferably continuous in the longitudinal direction and in which the principal components of the device are accommodated.

The vacuum source 2 comprises a suction nozzle means 6 with one or more suction nozzles. In the working example of FIG. 1 a single suction nozzle 7 is provided. The working example illustrated in FIG. 2 on the other hand constitutes a vacuum handling device 1 with at least two suction nozzles functionally connected in parallel.

At this point it is to be noted that in the case of the working example of FIG. 2 identical reference numerals are employed to the extent parts corresponding to those of FIG. 1 are present.

The suction nozzle 7 is seated in the interior of the housing unit 4. As shown in FIG. 1 it is located in the above mentioned cavity 5. Its assembly takes place starting at the one end of the housing unit 4, preferably by insertion or plugging in place.

This type of design is preferred when the suction nozzle 7, as in the present case, is in the form of a cartridge-like structural unit, which is assembled prior to insertion into the housing unit and is then inserted as a whole, that is to say as a unit, into the housing unit 4.

The suction nozzle 7 has at one end an inlet opening 8, which is constantly connected with a supply connection 12 of the device. In the case of the vertical alignment of the vacuum handling device 1 as illustrated in the drawing the inlet opening 8 is directed upward and the supply connection 12 is located near the top end of the housing unit 4.

The supply connection 12 is provided with connection means 13, which render possible a fluid-tight and preferably detachable connection of a fluid line 14 as indicated in chained lines. By way of this fluid line 14 a connection of the supply connection 12 with a source of pressure medium may be produced, such pressure medium source preferably being a source of compressed air. It is in this manner that fluid pressure medium may be supplied by way of the supply connection 12 and fed to the inlet opening 8 of the suction nozzle 7.

The connection means 13 are preferably designed in the form of plug connecting means.

In the working embodiment illustrated in FIG. 2 the inlet openings 8 of both suction nozzles 7 are jointly connected with the supply connection 12.

Furthermore the suction nozzle 7 has a suction opening 15 at the terminal portion axially opposite to the inlet opening 8. In the working embodiment this opening is directed downward.

Finally the suction nozzle 7 furthermore possesses an outlet opening 16 which is connected with an outlet 17 opening to the outer face of the housing unit 4, and accordingly leading into the atmosphere, from the housing unit 4. This exit is in the working example at an angle and preferably at a right angle to the longitudinal axis of the suction nozzle 7 and is located alongside the housing unit 4.

During operation pressure medium introduced by way of supply connection 12 flows through the suction nozzle 7, it firstly flowing through a jet nozzle duct 18, wherein it is preferably accelerated to a supersonic speed. After emerging from the jet nozzle duct 18 the pressure medium then runs through an intermediate space 22 and then enters a receiver nozzle duct 23, which runs to the outlet opening 16. Thence the pressure medium flows by way of the outlet 17 into the atmosphere.

The flow direction of the pressure medium within the suction nozzle 7 extends as far as the outlet opening 16 generally in the longitudinal direction of the suction nozzle 7. Following this the pressure medium is directed by a deflector wall 24 of the suction nozzle 7 to the laterally arranged outlet 17.

The jet nozzle duct 18 constitutes, together with the receiver nozzle duct 23, an ejector means, which owing to the pressure medium flowing through it produces an aspirating effect in the intermediate space 22. Since the intermediate space 22 communicates by way of an internal connecting duct 25 of the suction nozzle 7 with the suction opening 15 there is accordingly an aspirating effect at the suction opening 15 as well.

In the case of the working example illustrated in FIG. 2 comprising a plurality of parallel-connected suction nozzles 7 all suction openings 15 are connected together with one another so that there is a simultaneous aspirating effect of all suction nozzles 7.

The suction gripper 3 is axially connected with the vacuum source 2 in the downward direction in the figure. It includes a vacuum gripper part, referred to in the following merely as the gripper part 26, which is able to hold an object 29 by vacuum action.

The gripper part 26 is located partially outside and partially within the housing unit 4. It is seated on the terminal portion, opposite to the supply connection 12, of the housing unit 4, which terminal portion is directed downward in the drawing.

The gripper part 26 has, at its free end axially opposite to the housing unit 4, a flexible suction cup 27 or an at least partially flexible suction plate, which is secured in a sealing manner to a plunger body 28 of the gripper part 26. The plunger body 28 is aligned in the longitudinal direction of the housing unit 4 and extends into a receiving chamber 32 in the interior of the housing unit 4. The receiving chamber 32 is preferably constituted by the associated terminal section of the continuous cavity 5.

The inner terminal section 33 axially opposite to the suction cup 27 of the gripper part 26 is piston-like in shape. It is sealingly connected by means of a circumferential seal 34, making sealing contact, with the circumferential wall of the receiving chamber 32 and accordingly divides the receiving chamber 32 in a sealing manner into two axially sequential spaces 35 and 36.

The space 35 located on the side, which faces the suction nozzle means 6, of the piston-like terminal section 33, will be termed the active plenum. It is constantly connected with the suction opening 15 and is accordingly in fluid connection with the suction side of the suction nozzle means.

The other, second space 36 communicates constantly with the atmosphere, for example by way of an intermediate space 37, which is located around the plunger body 28 between the same and a terminating wall 38 delimiting the receiving chamber 32 axially to the outside.

The gripper part 26 has an aspiration duct 42 extending axially through it. Such duct opens at one end into the active plenum 35 and at the other end into a suction space 43 delimited by the Suction cup 27.

The aspirating action produced during operation of the suction nozzle means 6 at the suction opening 15 accordingly leads to aspiration of air from the active plenum 35, the aspiration duct 42 and the suction space 43.

In order to lift an object 29 the vacuum handling device 1 ia placed against the respective object 29 with the open side of the suction cup 27 to the fore. This means that the suction space 43 is sealed off all around it. The aspirating effect of the suction nozzle means 6 produces vacuum on the suction side, as far as the suction space 43, such vacuum ensuring the object 29 is sucked held against the gripper part 26.

The acting suction direction 44 indicated by an arrow in the drawing, extends in the longitudinal direction of the gripper part 26 and as a rule at a right angle to the plane of extent of the suction opening, covered by the object 29 on it, of the suction space 43.

As shown in clearly in the figures, the suction gripper 3 and the vacuum source 2 are preferably arranged one after the other in the direction 44 of suction action.

The suction gripper 3 conveniently possesses spring means 45 biasing the gripper part 26 into a home position moved farther out of the housing unit 4 This home position applies in the case of the gripper part 26 depicted in FIG. 1 to the right of the longitudinal axis 46 of the vacuum handling device.

The spring means 45 take effect between the gripper part 26 and the housing unit 4. Preferably, they are placed in the interior of the active plenum 35 and designed in the form of compression spring means, which bear against the piston-like terminal section 33 of the gripper part 26 and the axially opposite wall of the receiving chamber 32.

Abutment means, which are secured to the housing, serve to ensure that the gripper part 26 is not moved beyond the desired home position out of the housing unit. Such abutment means are in the working example of the invention constituted by the terminal wall 38 against which the gripper part 26, for instance at its piston-like terminal section, may strike.

The gripper part 26 is able to be displaced by a setting force $F_v$ against the spring force $F_F$ of the spring means 45. It can accordingly be set in position in the acting suction direction 44 in relation to the housing unit 4.

The setting force $F_v$ may for example be produced because the vacuum handling device 1 has its gripper part 26 thrust against the object 29 on positioning the object 29 and accordingly the gripper part 26 is shifted a small distance against the spring force in relation to the housing unit 4. It is in this manner that the positioning of the vacuum handling device 1 in relation to an object 29 is facilitated, since a certain degree of inaccuracy or tolerance is possible as regards positioning.

The behavior indicated has a favorable effect when several vacuum handling devices 1 are collected together in a single handling unit and simultaneously are to be applied to an object 29. The resiliently elastic adjustability will in this case compensate for different positions of the gripper parts 26 automatically. It is possible to speak of an automatic length compensation.

The gripper part 26 slides on being set, its seal 34 running on the inner face of the receiving chamber 32.

It is possible for the setting $F_v$ also to be produced completely or partially by the pressure difference obtaining at the piston-like terminal section 33. If the gripper part 26 has its suction cup 27 in sealing engagement with the object 29 and then the above mentioned vacuum is produced, the pressure difference will take effect between the lower pressure obtaining in the active plenum 35 and the atmospheric pressure obtaining in the second space 36 in such a manner on the gripper part 26 that there is a resulting pressure force acting in the suction direction and hence the gripper part 26 including the held object 29 will be shifted in relation to the housing unit 4. Accordingly the object 29 is automatically lifted without any lifting effect being required on the part of the housing unit 4. The lifting stroke is in this case defined by the axial displacement available for the gripper part 26.

Owing to the joining together of the vacuum source 2 and the suction gripper 3 by way of the housing, there is a structural unit able to be handled in one piece and for whose fixation in place a single, common holding means 48 is sufficient. Separate holders for the vacuum source 2 and the suction gripper 3 are unnecessary. The holding means 48 forms part of, for example, a positioning means, with which the handling means can be moved and positioned with and without any object being held by it.

In the case of need the fluid connection between the suction space 43 and the suction opening may run through a flow control valve 47 indicated in chained lines in FIG. 1. Preferably, such valve is seated in the aspiration duct 42 extending through the plunger body 28 in the longitudinal direction. It may be employed for flow regulation in such a manner that the aspirated flow is also reduced during operation of the suction nozzle means 6 as long as the suction space 43 is covered.

In the case of need the housing unit 4 may have further components integrated in it as required for operation. For instance the housing unit 4 may have a means for automatically economizing in air or have a vacuum-controlled valve for controlling the manner of operation. For instance, a compressed air receiver could be integrated from which a gage pressure pulse could be taken in order to kill the built up vacuum for depositing the lifted object 29 as smartly as possible.

The invention claimed is:

1. A vacuum handling device comprising a vacuum source which possesses a suction nozzle means adapted to operate on an ejector principle, a suction gripper which possesses a movable gripper part connected directly with a suction side of the suction nozzle means, and a housing unit having a cavity containing both said suction nozzle means and at least a portion of said gripper part and wherein the gripper part is adjustably mounted on the housing unit for setting in an acting suction direction, and wherein said suction nozzle means has a longitudinal axis defined by an inlet opening and an opposite suction opening at said suction side, said movable gripper part being coaxially arranged with said longitudinal axis of said suction nozzle means, and wherein said housing unit includes an outlet fluidly communicating with said inlet opening of said suction nozzle means and extending through said housing unit at a right angle with respect to said longitudinal axis of said suction nozzle means, and further comprising a spring means effective between the gripper part and the housing unit which biases the gripper part into a maximally extended home position, the gripper part being able to be shifted out of position by a setting force ($F_v$) against the spring force (FF) of the spring means.

2. The vacuum handling device as set forth in claim 1, wherein the suction nozzle means is a cartridge, said cartridge being plugged into the housing unit.

3. The vacuum handling device as set forth in claim 1, wherein the gripper part is connected fluidwise in the interior of the housing unit with the suction side of the suction nozzle means.

4. The vacuum handling device as set forth in claim 1, wherein the adjustably mounted gripper part projects into the housing unit.

5. The vacuum handling device as set forth in claim 1, wherein said gripper part has an aspiration duct and a flow control valve seated in said aspiration duct for controlling a flow of fluid through said gripper part.

6. A vacuum handling device comprising a vacuum source which possesses a suction nozzle means adapted to operate on an ejector principle, a suction gripper which possesses a movable gripper part connected with a suction side of the suction nozzle means, and a housing unit containing both said suction nozzle means and at least a portion of said gripper part and wherein the gripper part is adjustably mounted on the housing unit for setting in an acting suction direction, and wherein the adjustable gripper part delimits, in the interior of the housing unit an active plenum communicating with the suction side of the suction nozzle means, the vacuum built up in the active plenum being able to cause setting of the gripper part in relation to the housing unit from a farther extended position into a farther retracted position, and wherein said suction nozzle means has a longitudinal axis defined by an inlet opening and an opposite suction opening at said suction side, said movable gripper part being coaxially arranged with said longitudinal axis of said suction nozzle means, and wherein said housing unit includes an outlet fluidly communicating with said inlet opening of said suction nozzle means and extending through said housing unit at a right angle with respect to said longitudinal axis of said suction nozzle means, wherein the gripper part is biased into the farther extended position by spring means.

7. The vacuum handling device as set forth in claim 6, wherein the gripper part has at least one suction space on its outer end, such space being connected by way of an aspiration duct extending through the gripper part with the plenum.

8. The vacuum handling device as set forth in claim 7, wherein the space is delimited by at least one suction plate or suction cup.

9. The vacuum handling device as set forth in claim 6, wherein the suction nozzle means is a cartridge, said cartridge being plugged into the housing unit.

10. The vacuum handling device as set forth in claim 6, wherein the gripper part is connected fluidwise in the interior of the housing unit with the suction side of the suction nozzle means.

11. The vacuum handling device as set forth in claim 6, wherein said gripper part has an aspiration duct and a flow control valve seated in said aspiration duct for controlling a flow of fluid through said gripper part.

12. A vacuum handling device comprising a vacuum source which possesses a suction nozzle means adapted to operate on an ejector principle, a suction gripper which possesses a movable gripper part connected with a suction side of the suction nozzle means, and a housing unit containing both said suction nozzle means and at least a portion of said gripper part and wherein the gripper part is adjustably mounted on the housing unit for setting in an acting suction direction, and wherein the adjustable gripper part delimits, in the interior of the housing unit an active plenum communicating with the suction side of the suction nozzle means, the vacuum built up in the active plenum being able to cause setting of the gripper part in relation to the housing unit from a farther extended position into a farther retracted position, and wherein said suction nozzle means has a longitudinal axis defined by an inlet opening and an opposite suction opening at said suction side, said movable gripper part being coaxially arranged with said longitudinal axis of said suction nozzle means, and wherein said housing unit includes an outlet fluidly communicating with said inlet opening of said suction nozzle means and extending through said housing unit at a right angle with respect to said longitudinal axis of said suction nozzle means, and wherein the active plenum is delimited by a piston-like terminal section of the gripper part, which is arranged in a sliding fashion in the interior of the housing unit with a sealing means between it and the housing.

13. The vacuum handling device as set forth in claim 12, wherein the suction nozzle means is a cartridge, said cartridge being plugged into the housing unit.

14. The vacuum handling device as set forth in claim 12, wherein the gripper part is connected fluidwise in the interior of the housing unit with the suction side of the suction nozzle means.

15. The vacuum handling device as set forth in claim 12, wherein the adjustably mounted gripper part projects into the housing unit.

16. The vacuum handling device as set forth in claim 12, wherein said gripper part has an aspiration duct and a flow control valve seated in said aspiration duct for controlling a flow of fluid through said gripper part.

17. The vacuum handling device as set forth in claim 12, wherein the gripper part has at least one suction space on its outer end, such space being connected by way of an aspiration duct extending through the gripper part with the plenum.

18. The vacuum handling device as set forth in claim 17, wherein the space is delimited by at least one suction plate or suction cup.

19. vacuum handling device comprising:
   a housing having a longitudinal axis, an inlet supply connection, an outlet opening extending through said housing at a right angle with respect to said housing longitudinal axis and a cavity formed between said inlet supply connection and said outlet opening;
   a suction nozzle, adpted to operate on an ejection contained within said housing cavity between said inlet supply connection and said outlet opening, said suction nozzle having a longitudinal axis defined by an inlet opening communicating with said housing inlet supply connection and an opposite suction opening and producing a suction at said suction opening when a pressure medium is supplied to said inlet supply connection of said housing, said suction nozzle longitudinal axis being coaxial with said housing longitudinal axis; and a movable gripper part at least partially slidingly contained within said housing cavity, said gripper part being in direct fluid communication with said suction opening of said suction nozzle for holding an object by vacuum action and having an axis of movement coaxial with said housing longitudinal axis and said suction nozzle longitudinal axis.

20. A vacuum handling device as set forth in claim 19, wherein said suction nozzle further comprises an intermediate space disposed adjacent said inlet opening, a receiver nozzle duct extending between said intermediate space and said outlet opening of said housing and an internal connecting duct extending between said intermediate space and said suction opening, said internal connecting duct being coaxial with said receiver nozzle duct.

* * * * *